United States Patent [19]

Tsukamoto et al.

[11] Patent Number: 4,862,853
[45] Date of Patent: Sep. 5, 1989

[54] METHOD OF CONTROLLING INDIVIDUAL CYLINDER FUEL INJECTION QUANTITIES IN ELECTRONICALLY CONTROLLED DIESEL ENGINE AND DEVICE THEREFOR

[75] Inventors: Keisuke Tsukamoto, Nagoya; Masaomi Nagase, Toyota; Kiyotaka Matsuno, Toyota, all of Japan

[73] Assignee: Toyota Jidosha Kabushiki Kaisha, Aichi, Japan

[21] Appl. No.: 696,522

[22] Filed: Jan. 30, 1985

[30] Foreign Application Priority Data

Jan. 31, 1984 [JP] Japan .................................. 59-15587

[51] Int. Cl.$^4$ .............................................. F02M 9/00
[52] U.S. Cl. .................................... 123/357; 123/419; 123/506
[58] Field of Search ............... 123/506, 357, 458, 500, 123/501, 358, 359, 419

[56] References Cited

U.S. PATENT DOCUMENTS

| | | | |
|---|---|---|---|
| 4,322,800 | 3/1982 | Hisegawa | 123/419 |
| 4,323,042 | 4/1982 | Woodhouse | 123/419 |
| 4,357,662 | 11/1982 | Schira | 123/419 |
| 4,372,266 | 2/1983 | Hiyama | 123/357 |
| 4,375,668 | 3/1983 | Leung | 123/419 |
| 4,448,171 | 5/1984 | Ninomiya | 123/419 |

Primary Examiner—Carl Stuart Miller
Attorney, Agent, or Firm—Kenyon & Kenyon

[57] ABSTRACT

In effecting individual cylinder fuel injection quantity control in an electronically controlled diesel engine, wherein rpm variation with every explosion cylinder is detected, and a fuel injection quantity spill control actuator is controlled with every cylinder so as to eliminate a dispersion in rpm variation between the cylinders, so that engine vibrations due to the dispersion in fuel injection quantity between the cylinders can be reduced, timing of a control command to the fuel injection quantity spill control actuator is determined in accordance with engine speed and engine load to avoid both a delay in control to a cylinder to be corrected and interference with the injection of fuel to a cylinder immediately before the cylinder to be corrected, and a control command for every cylinder is given to the fuel injection quantity spill control actuator at the determined timing.

5 Claims, 11 Drawing Sheets

METHOD OF CONTROLLING INDIVIDUAL CYLINDER FUEL INJECTION QUANTITIES IN ELECTRONICALLY CONTROLLED DIESEL ENGINE AND DEVICE THEREFOR

BACKGROUND OF THE INVENTION

1. Field of the Invention

This invention relates to a method of controlling individual cylinder fuel injection quantities in an electronically controlled diesel engine and a device therefor, particularly suitable for use in a motor vehicle, wherein rpm variations with every explosion cylinder are detected and a fuel injection quantity spill control actuator is controlled with every cylinder so as to eliminate a dispersion in rpm variation between the cylinders, so that engine vibrations due to the dispersion in fuel injection quantity between the cylinders can be reduced.

2. Description of the Prior Art

Figure 1:
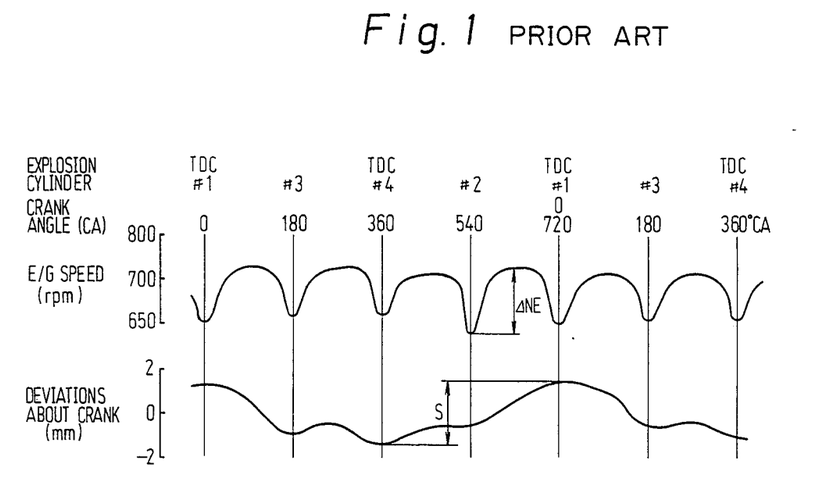
FIG. 1 is a graphic chart showing the relationship between the rpm variation and surging of deviations about the crank in the conventional electronically controlled diesel engine.

In general, the vibrations of a diesel engine during idling are by far higher than those of a gasoline engine. The diesel engine resiliently supported by an engine mounting mechanism resonates with the engine vibrations not only causing discomfort to occupants of a vehicle, but also adversely affecting components around the engine. This is mainly caused by the vibrations of the primary/secondary low frequencies attributed to periodical dispersions of the fuel fed under pressure to the respective cylinders at a rate only half the rpm of the diesel engine when the diesel engine is of four cycle type, for example. More specifically, in a diesel engine, if a dispersion occurs in the fuel injection quantity between the cylinders, then, as shown in FIG. 1, the rpm variations NE between the explosion cylinders (at 180° CA (crank angle) in the case of a four cylinder engine) are not equal to one another, whereby surging S of deviations about a crank occurs at a cycle of every four explosions, which surge gives an uncomfortable feeling to an occupant of a vehicle. In the drawing, TDC designates top dead center.

It is conceivable to manufacture an engine body, a fuel injection pump, and an injection nozzle with very high accuracies, so that a dispersion in fuel quantities fed to respective cylinders can be reduced. However, to achieve this, great difficulties in production engineering are encountered, and a fuel injection pump and the like become very expensive. Alternatively, an engine mounting mechanism can be improved so as to reduce the vibrations of the engine. However, the mounting mechanism becomes complicated and expensive, and the vibrations of the diesel engine itself are not reduced thereby, thus not solving the fundamental problem.

Figure 2:
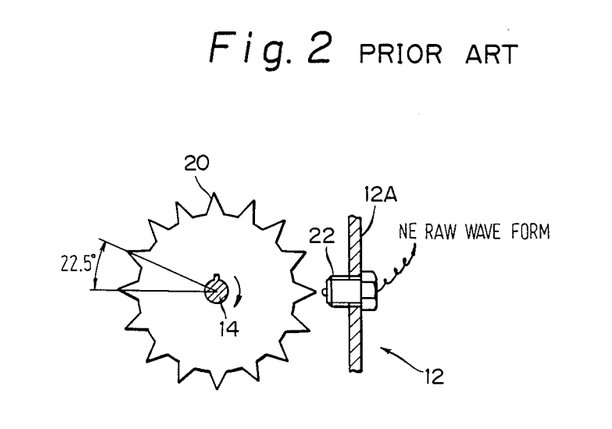
FIG. 2 is a sectional view showing the arrangement of the engine rotation sensor used in the conventional electronically controlled diesel engine.
Figure 3:
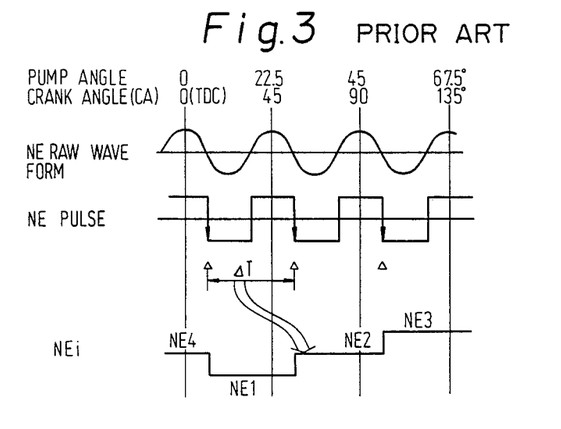
FIG. 3 is a graphic chart showing the conventional method of determining the engine speed through 45° CA.

To obviate the above-described problem, it is known to obtain an NE raw waveform by a gear 20 secured to a drive shaft 14 of a fuel injection pump 12 and an engine rotation sensor 22 mounted to a pump housing 12A as shown in FIG. 2, for example. An engine speed $NE_i$ (i=1 to 4) is calculated for each increment of 45° CA in the 180° of crank angle immediately before TDC of the cylinder to be corrected from the time duration $\Delta T$ needed for the rotation through 22.5° PA (pump angle) of the drive shaft 14 (corresponding to 45° CA of the engine), which is detected by a fall of an NE pulse formed from the NE raw waveform as shown in FIG. 3.

Figure 4:
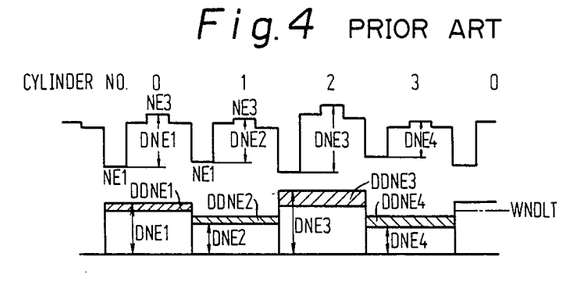
FIGS. 4 and 5 are graphic charts showing the conventional method of determining individual cylinder correction quantities.
Figure 5:
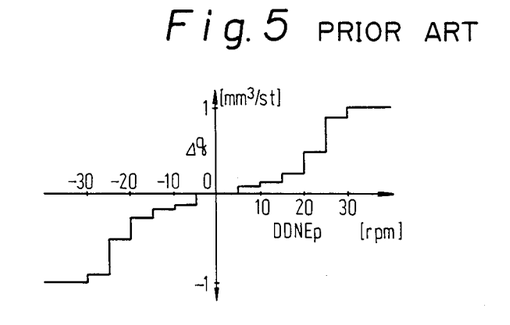

An rpm variation $DNE_p$ (p=1 to 4) of every explosion cylinder is detected from the engine speed $NE_i$ as shown in FIG. 4, and the resultant value is compared with a mean value $$WNDLT\left( = \sum_{p=1}^{4} DNE_p/4 \right)$$

of the rpm variations of all of the cylinders. When the rpm variation of the cylinder is smaller than the mean value WNDLT, the fuel injection quantity of the cylinder is considered to be too small; a fuel injection quantity $\Delta q$ to be increased is learned in accordance with a difference $DDNE_p$ (p=1 to 4), as shown in FIG. 5, for example, and is implemented at the time of a subsequent fuel injection of the cylinder. On the contrary, when the rpm variation of the cylinder is larger than the mean value WNDLT, it is desirable to decrease the fuel injection quantity of the cylinder.

Figure 6:
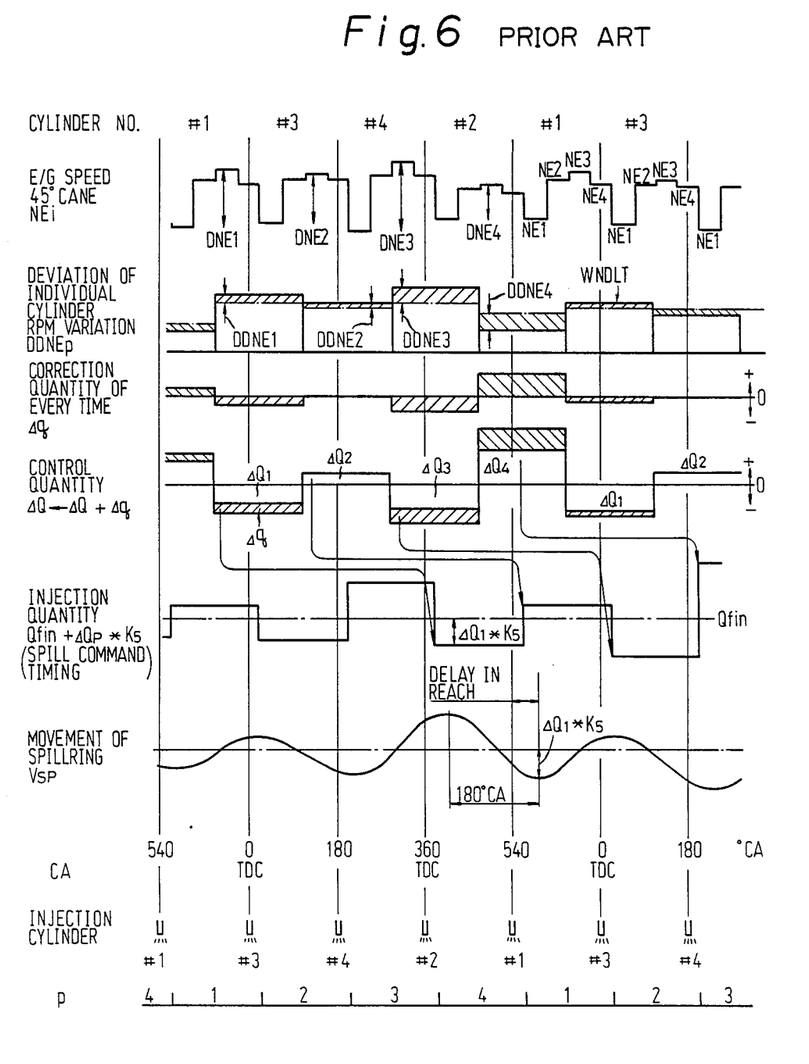
FIG. 6 is a graphic chart showing an example of signal waveforms in various portions in the prior art.

A fuel injection control actuator, such as a spill actuator for controlling a spill ring in a distribution type fuel injection pump, is readjusted for every cylinder until the rpm variations of the respective cylinders become uniform, as illustrated in FIG. 6, for example. The fuel injection quantity is increased or decreased with every cylinder to eliminate dispersion in fuel injection quantity between the cylinders, thereby reducing the engine vibrations.

Referring to FIG. 6, $\Delta Q_p$ (p = 1 to 4) is an individual cylinder correction quantity as being an integrated value of every correction quantity $\Delta q$; $K_5$ is a coefficient of correction for preventing hunting when the engine speed is within a range between 1000 rpm and 1500 rpm and the transmission is in neutral, wherein the higher the engine speed, the lower is the individual cylinder correction quantity; $Q_{fin}$ is an injection quantity calculated from a mean engine speed NE, an accelerator opening Accp and the like; and Vsp is an output from a spill position sensor for detecting a displacement of the spill control actuator.

Figure 7:
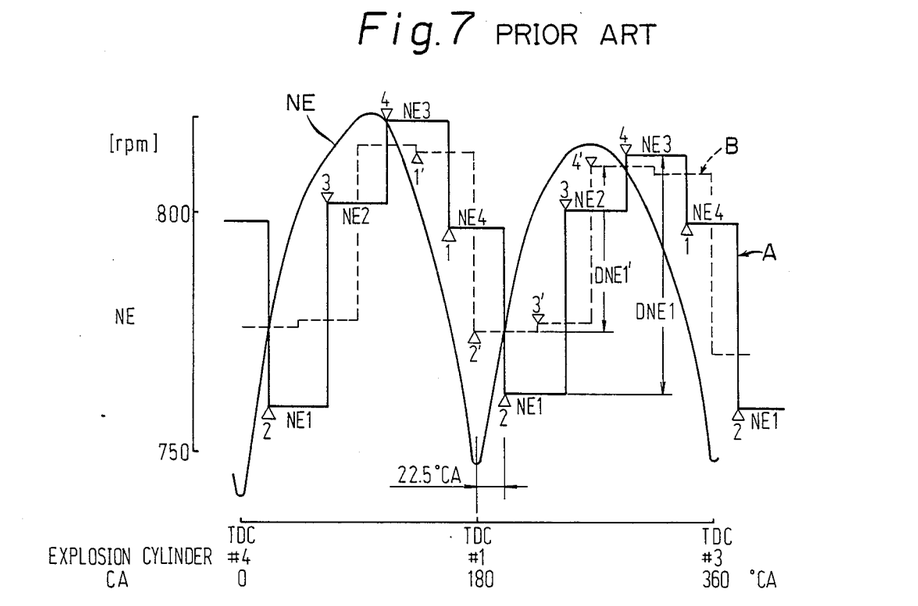
FIG. 7 is a graphic chart showing the relationship between the position of top dead center and the position of calculating the engine speed in the prior art.

Heretofore, in the distribution type fuel injection pump, for example, a delay of the spill ring in response and reach has been anticipated and the individual cylinder correction quantity has been previously outputted before a predetermined crank angle determined by an NE pulse so as not to interfere with the injections of other cylinders, whereby the individual cylinder control has been performed. However, there has been a possibility that the movement of the spill ring will come too late for the fuel injection of the cylinder to be corrected. For example, in order to make the calculated engine speed $NE_i$, which has been obtained through every 45° CA, approach a value as close as possible to the actual engine speed, it is necessary to bring the TDC to the center of a time period needed for the 45° CA rotation used in the calculation of the engine speed, $NE_i$, for example. Since the engine speed $NE_i$ is calculated from a time period between a time $\Delta_1$ and a time $\Delta_2$ as shown in FIG. 7, a great difference occurs in 45° CA $NE_i$ depending upon whether the TDC position occurs midway between the time $\Delta_1$ and the time $\Delta_2$ as indicated by a solid line A or TDC occurs at the time $\Delta_2'$ as indicated by a broken line B.

Since the individual cylinder correction quantity is determined from the rpm variation, in the individual cylinder fuel injection quantity control it is desirable that the waveform of $NE_i$ be one indicated by the solid line A. In consequence, TDC should occur 22.5° CA before the calculation of $NE_h$, i.e. the time $\Delta_2$. On the other hand, since the beginning of the fuel injection during idling and the like is normally located at a position around the TDC, there has been a high possibility that the spill ring cannot make a follow-up because, as against a time duration of 30 to 40 milliseconds (144° CA to 192° CA at 800 rpm) needed for the spill ring to move to a target value, in the conventional individual cylinder injection quantity correction, the command instructing a movement value to the spill ring actuator is given at the time of calculation of $NE_h$, namely, 157.5° CA before the injection. Particularly, the delay in reach becomes very large when an air conditioner is on, the engine is idling fast, and the like.

SUMMARY OF THE INVENTION

The present invention has been developed to obviate the above-described disadvantages of the prior art and has as its object the provision of a method of controlling individual cylinder fuel injection quantities in an electronically controlled diesel engine and a device therefor, wherein, even at the time of medium engine load where an air conditioner is on and/or an automatic transmission is selected to drive range and at the time of fast idling and the like, no interference occurs with the fuel injection of a cylinder immediately before a cylinder to be corrected, and a delay in control of a fuel injection quantity control actuator to the cylinder to be corrected can be avoided, so that engine vibrations due to a dispersion in fuel injection quantity between the cylinders can be reliably reduced.

Figure 8:
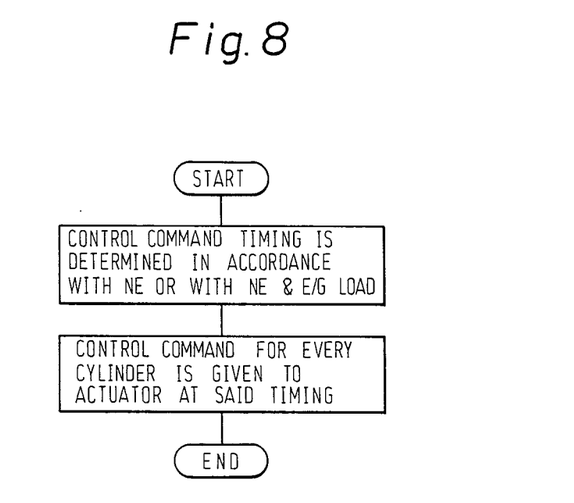
FIG. 8 is a flow chart showing the technical gist of the method of controlling individual cylinder fuel injection quantities in the electronically controlled diesel engine according to the present invention.

To this end, the present invention contemplates that, in a method of controlling individual cylinder fuel injection quantities in an electronically controlled diesel engine, wherein rpm variations with every explosion cylinder are detected and a fuel injection quantity spill control actuator is controlled with every cylinder so as to eliminate a dispersion in rpm variation between the cylinders, so that engine vibrations due to the dispersion in fuel injection quantity between the cylinders can be reduced, as the technical gist thereof is illustrated in FIG. 8, the method comprises the steps of:

determining a control command timing for the fuel injection quantity spill control actuator in accordance with an engine speed and an engine load so as to avoid a delay in control to a cylinder to be corrected without interfering with the fuel injection to a cylinder immediately before the cylinder to be corrected; and giving a control command for every cylinder to the fuel injection quantity control actuator at the aforesaid control command timing.

To the above end, the present invention contemplates that, in a device for controlling individual cylinder fuel injection quantities in an electronically controlled diesel engine, the device comprises:

a fuel injection pump including a spill ring for controlling fuel injection quantities and a spill actuator;

injection nozzles for injecting fuel discharged from the fuel injection pump into combustion chambers;

an accelerator sensor for detecting an accelerator position;

an engine rotation sensor for detecting an engine speed; and a control unit for determining a target injection quantity from at least the accelerator position and the engine speed, for controlling the spill control actuator so that the fuel of the target injection quantity can be discharged from the fuel injection pump, for determining a control command timing for the spill control actuator in accordance with an engine speed and an engine load so as to avoid a delay in control to a cylinder to be corrected without interfering with the fuel injection to a cylinder immediately before the cylinder to be corrected, and giving a control command for every cylinder to the spill control actuator at the control command timing so as to eliminate a dispersion in rpm variation.

A specific form of the present invention is of such an arrangement that the control command timing is determined by a mean engine speed during a rotation through 180° CA to the TDC of a cylinder immediately before the cylinder to be corrected so that a proper control command timing can be rapidly obtained.

Another specific form of the present invention is of such an arrangement that, the higher the engine speed, the earlier is the control command timing, so that a delay in control at a time of relatively high engine speed, such as during fast idling and the like, can be reliably avoided.

A further specific form of the present invention is of such an arrangement that the control command timing substantially coincides with the TDC of the cylinder immediately before the cylinder to be corrected, so that a command for the cylinder to be corrected can be given at an earlier time without interfering with the fuel injection of the cylinder immediately before the cylinder to be corrected.

A still further specific form of the present invention is of such an arrangement that, the higher the engine load, the more the control command timing is delayed, so that interference with the fuel injection of the cylinder immediately before the cylinder to be corrected can be reliably avoided at the time of a medium engine load such as when the air conditioner is on and when an automatic transmission is selected to drive range.

A yet further specific form of the present invention is of such an arrangement that the engine load is detected from the fuel injection quantity, so that an accurate engine load can be easily determined.

According to the present invention, since the control command timing for the fuel injection quantity spill control actuator is varied in accordance with an engine speed and an engine load, even at the time of the engine speed being relatively high and at the time of a medium engine load, no delay in control of the fuel injection quantity control actuator occurs. Moreover, no interference is made with the fuel injection to the cylinder immediately before the cylinder to be corrected, and the fuel injection quantities to the respective cylinders are controlled without excess and deficiency, so that the dispersion in injection quantity between the cylinders can be reliably reduced. Hence, surging during idling and the like can be reliably decreased, thereby reducing the uncomfortable feeling given to an occupant in the vehicle.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein.

DETAILED DESCRIPTION OF THE INVENTION

Detailed description will hereunder be given of embodiments of the electronically controlled diesel engine in a motor vehicle, to which is applied the method of controlling individual cylinder fuel injection quantities according to the present invention, with reference to the drawings.

Figure 9:
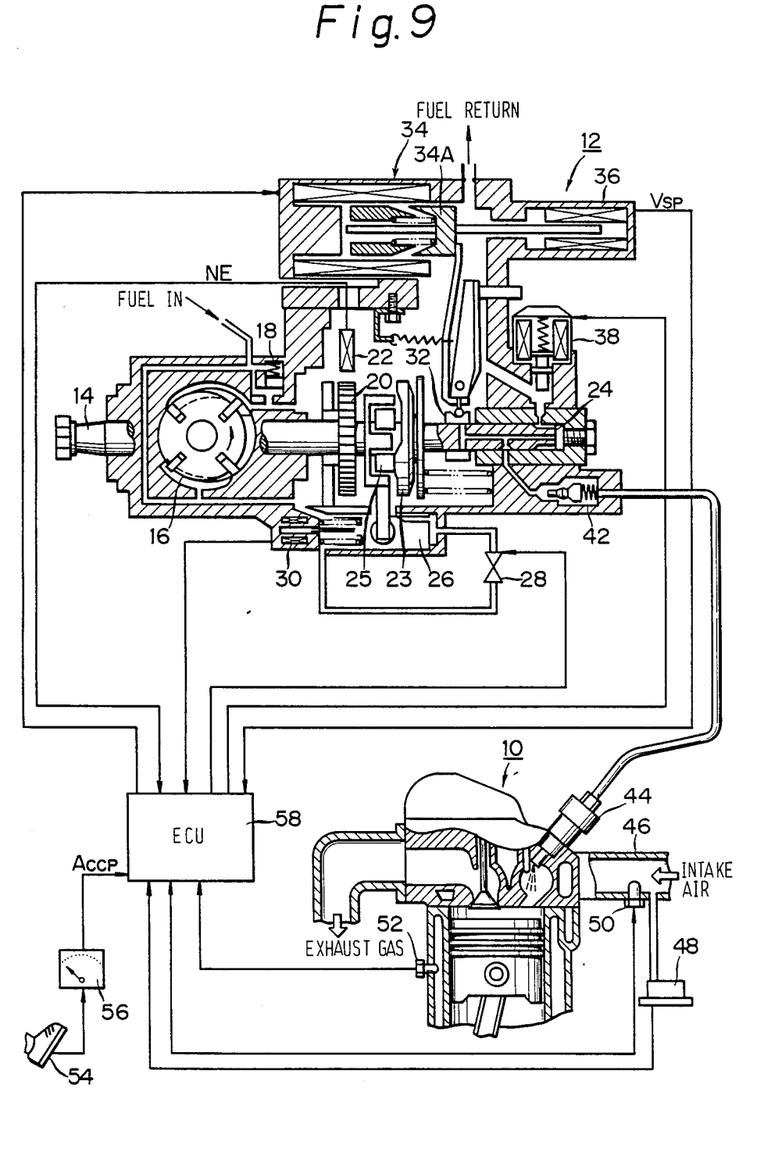
FIG. 9 is a sectional view, partially including a block diagram, showing the general arrangement of a first embodiment of the electronically controlled diesel engine in a motor vehicle, to which the present invention is applied.

As shown in FIG. 9, the first embodiment of the present invention comprises:
a distribution type fuel injection pump 12 including a drive shaft 14 rotatable in association with the rotation of a crankshaft of a diesel engine 10, a feed pump 16 (FIG. 9 shows a state of the feed pump unfolded through 90°) solidly secured to the drive shaft 14, for feeding the fuel under pressure, a fuel pressure regulating valve 18 for regulating fuel feeding pressure, an engine rotation sensor 22 formed of an electromagnetic pickup, for example, for detecting the rotating condition of a diesel engine 10 from a rotary displacement of a gear 20 solidly secured to the drive shaft 14, a roller ring 25 for driving a pump plunger 24 in cooperation with a face cam 23, a timer piston 26 (FIG. 9 shows a state of the timer piston unfolded through 90°) for controlling the rotational position of the roller ring 25, a timing control valve 28 for controlling the position of the timer piston 26 to control the fuel injection timing, a timer position sensor 30 formed of a variable inductance sensor, for example, for detecting a position of the timer piston 26, a spill ring 32 for controlling the fuel spill timing from the pump plunger 24, a spill control actuator 34 for controlling the position of the spill ring 32 to control the fuel injection quantity, a spill position sensor 36 formed of a variable inductance sensor, for example, for detecting a position Vsp of the spill ring 32 from a displacement of a plunger 34A of the spill control actuator 34, a fuel cutting solenoid (hereinafter referred to as an "FCV") 38 for cutting off the fuel when the engine is not in operation, and a delivery valve 42 for preventing the counterflow and after-dripping of fuel;

injection nozzles 44 for injecting the fuel discharged from the delivery valve 42 of the fuel injection pump 12 into combustion chambers of the diesel engine 10;

an intake air pressure sensor 48 for detecting the pressure of intake air taken in through an intake pipe 46;

an intake air temperature sensor 50 for detecting the temperature of the intake air;

a coolant temperature sensor 52 provided on a cylinder block of the engine 10, for detecting engine coolant temperature;

an accelerator sensor 56 for detecting a depressing angle (hereinafter referred to as an "accelerator position") Accp of an accelerator pedal 54 operated by a driver; and an electronic control unit (hereinafter referred to as an "ECU") 58 for determining a target injection timing and a target injection quantity from the accelerator position Accp detected from an output of the accelerator sensor 56, the engine speed NE obtained from an output of the engine rotation sensor 22, the engine coolant temperature detected by the coolant temperature sensor 52 and so on, and for controlling the timing controlling valve 28, the spill control actuator 34 and the like, so that the fuel of the target injection quantity can be injected from the fuel injection pump 12 at the target injection timing.

Figure 10:
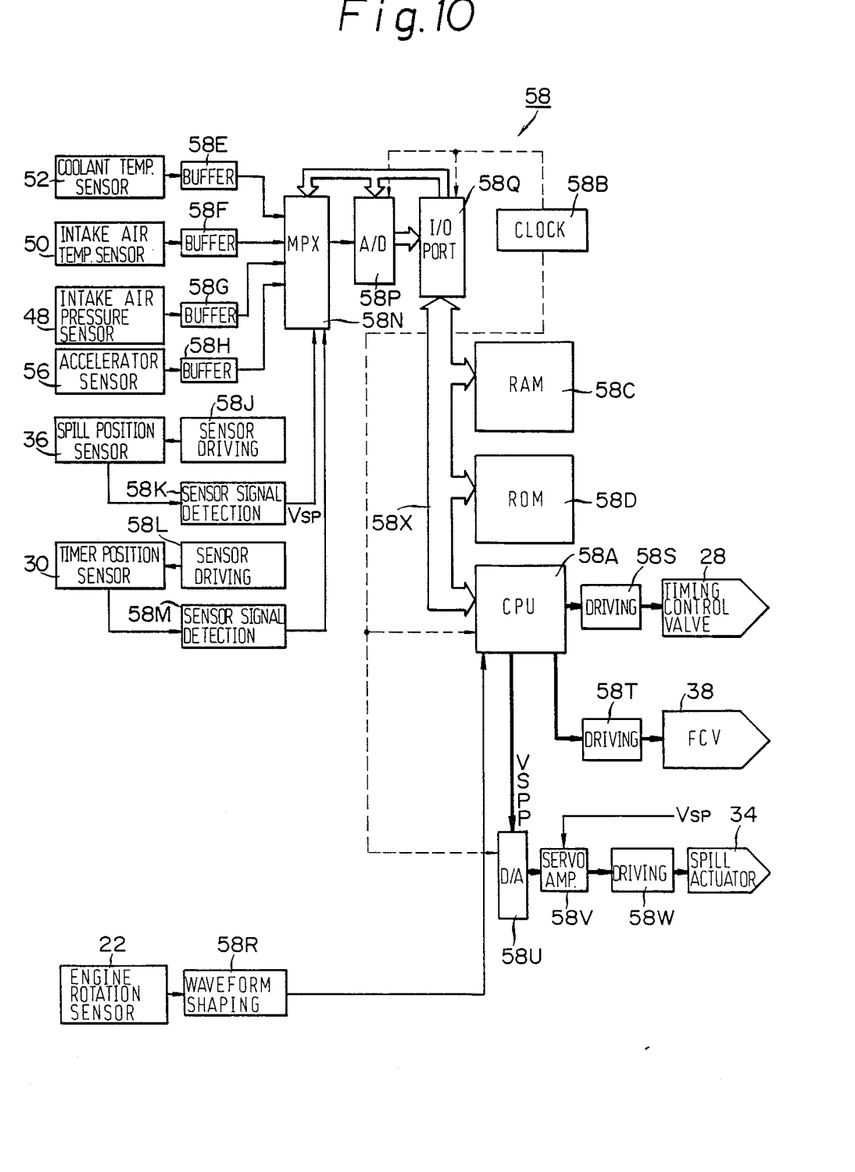
FIG. 10 is a block diagram showing the arrangement of the electronic control unit used in the first embodiment.

As shown in detail in FIG. 10, the ECU 58 comprises:
a central processing unit (hereinafter referred to as a "CPU") 58A formed of a microprocessor, for example, for performing various operations and processing;

a clock 58B for generating various clock signals; a random access memory (hereinafter referred to as a "RAM") 58C for temporarily storing operational data and the like in the CPU 58A;

a read only memory (hereinafter referred to as a "ROM") 58D for storing control programs, various data and the like;

a multiplexer (hereinafter referred to as an "MPX") 58N for successively taking in an output from the coolant temperature sensor 52, which is inputted through a buffer 58E, an output from the intake air temperature sensor 50, which is inputted through a buffer 58F, an output from the intake air pressure sensor 48, which is inputted through a buffer 58G, an output from the accelerator sensor 56, which is inputted through a buffer 58H, the output Vsp from the spill position sensor 36, which is driven in response to a sensor driving frequency signal outputted from a sensor driving circuit 58J, and inputted through a sensor signal detecting circuit 58K, an output from the timer position sensor 30, which is driven in response to a sensor driving frequency signal outputted from a sensor driving circuit 58L, and inputted through a sensor signal detecting circuit 58M and so on;

an analogue-digital converter (hereinafter referred to as an "A/D converter") 58P for converting analogue signals outputted from the MPX 58N into digital signals;

an input-output port (hereinafter referred to as an "I/O port") 58Q for taking an output from the A/D converter 58P into the CPU 58A;

a waveform shaping circuit 58R for waveform-shaping an output from the engine rotation sensor 22 and directly taking the same into the CPU 58A;

a driving circuit 58S for driving the timing control valve 28 in accordance with the result of operation of the CPU 58A;

a driving circuit 58T for driving the FCV 38 in accordance with the result of operation of the CPU 58A;

a servo amplifier 58V and a driving circuit 58W, for driving the spill control actuator 34 in accordance with a deviation between a spill position signal Vsp outputted from the spill position sensor 36 and an output from the CPU 58A, which is converted into an analogue signal by a digital-analogue converter (hereinafter referred to as a "D/A converter") 58U; and a common bus 58X for connecting the above-mentioned components to one another.

The operation of the first embodiment will now be described.

Figure 11:
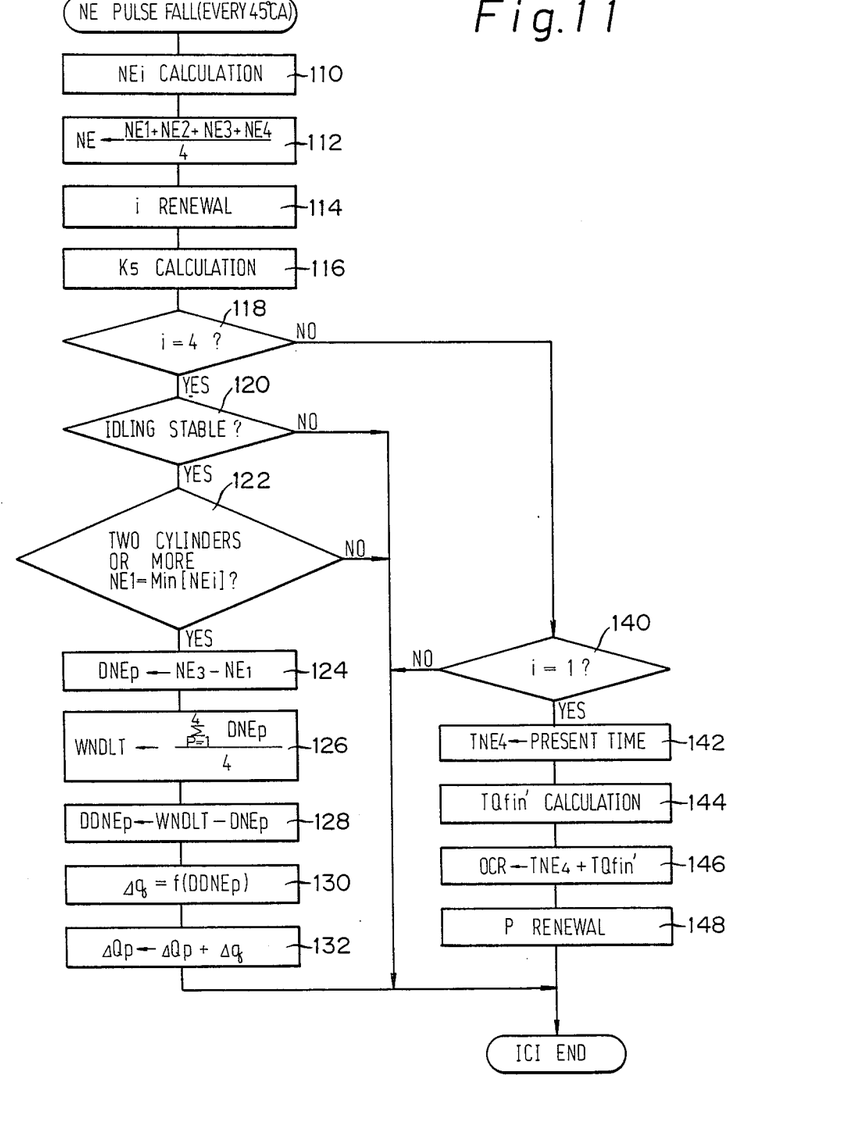
FIG. 11 is a flow chart showing the interrupt routine for determining the individual cylinder injection quantities.

Calculation of the individual cylinder correction quantities of the fuel injection quantities in the first embodiment is carried out by an input capture interrupt routine ICI passing with every 45° CA as shown in FIG. 11. More specifically, simultaneously with a fall of an NE pulse delivered at every 45° CA from the engine rotation sensor 22, the routine proceeds to Step 110, and, as shown in FIG. 3, an engine speed $NE_i$ (i = 1 to 4) with every 45° CA is calculated from a time duration $\Delta T$ between a fall of NE pulse of the last time to a fall of NE pulse of this time. A counter i is renewed in a sequence of 1 -2 -3 -4 -1 ... by falls of NE pulses, whereby this calculation of engine speed $NE_i$ is renewed in a sequence of $NE_1$- $NE_2$- $NE_3$- $NE_4$... with every 180° CA and stored in the respective memories.

Subsequently, the routine proceeds to Step 112, where a mean engine speed NE through 180° CA is calculated as shown in the following equation:

$$NE = (NE_1 + NE_2 + NE_3 + NE_4)/4 \qquad (1)$$

Figure 12:
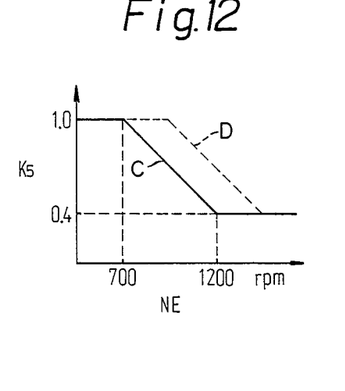
FIG. 12 is a graphic chart showing a map used in the aforesaid routine, for determining the coefficient of correction.

Then the routine proceeds to Step 114, where the counter i is renewed, and thereafter, in Step 116, a coefficient of correction $K_5$ corresponding to the engine speed NE for preventing hunting when the engine speed is relatively high, such as 1000 rpm–1500 rpm, is calculated from a map having the relationship indicated by broken lines D in FIG. 12, which is previously stored in the ROM 58D.

Subsequently, the routine proceeds to Step 118, where judgment is made as to whether the counted value of the counter i is 4 or not. When the result of judgment is positive, namely, it is immediately after the renewal in a sequence of 3 to 4 of the counter i, the routine proceeds to Step 120, where judgment is made as to whether the idling is in the stable state or not. When the result of judgment is positive, namely, all of the following conditions are established:

it is neither the time of starting nor the time immediately after starting, the accelerator position Accp is 0%, and the shift position is neutral (or a drive range is selected and the vehicle speed is zero in the case of a vehicle provided with an automatic transmission), for example, the routine proceeds to step 122, where judgment is made as to whether or not there are two or more cylinders in which the engine speed $NE_i$ is the minimum value out of $NE_1$-$NE_4$ for one and the same cylinder p. When the result of judgment is positive, namely, it is judged that no misfire and the like occur and the rotation is in the stable condition, the routine proceeds to Step 124, where rpm variations $DNE_p$ (p = 1 to 4) corresponding to the respective cylinders are calculated through the following equation, as shown in FIG. 4, and stored in the respective memories. Herein, a counter p is associated with the respective cylinders, when the counter i is changed in a sequence of 4 to 1, the renewals in a sequence of 1 -2 -3 -4 -1 ... are made, and one cycle is completed through 720° CA.

$$DNE_p \leftarrow NE_3 - NE_1 \qquad (2)$$

Subsequently, the routine proceeds to Step 126, where a mean value WNDLT of rpm variations is calculated through the following formula and stored.

$$WNDLT \leftarrow \sum_{p=1}^{4} DNE_p/4 \qquad (3)$$

Then the routine proceeds to Step 128, where a deviation $DDNE_p$ between the mean rpm variation WNDLT and the rpm variation $DNE_p$ of the respective cylinders is calculated through the following formula.

$$DDNE_p \leftarrow WNDLT - DNE_P \qquad (4)$$

Subsequently, the routine proceeds to Step 130, where individual cylinder correction quantities q of every time are calculated through the following equation in accordance with the calculated deviation $DDNE_p$, from the relationship as shown in FIG. 5, for example.

$$\Delta q = f(DDNE_p) \qquad (5)$$

Then, the routine proceeds to Step 132, where the individual cylinder correction quantity $\Delta q$ obtained this time is integrated to the intregrated quantity $\Delta Q_p$ integrated up to the last time, as is shown in the following formula, and stored as the quantity of this time, thereby completing the routine ICI.

$$\Delta Q_p \leftarrow \Delta Q_p + \Delta q \qquad (6)$$

Since the integrated quantity $\Delta Q_p$ is associated with the respective cylinders, there are four quantities including $\Delta Q_1$ to $\Delta Q_4$, and the upper and lower limits may be provided as necessary.

Steps 120-132 are included in a routine passing only when the counter i has the counted value 4, and hence, the routine passes immediately after the calculation of $NE_3$ is completed, namely, only once for every 180° CA.

Figure 13:
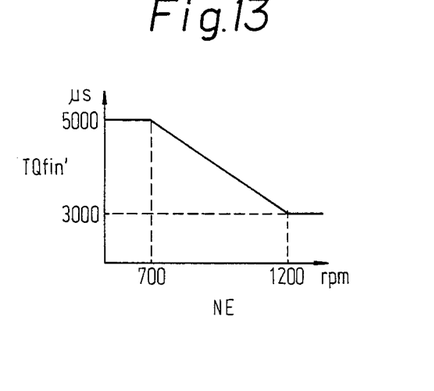
FIG. 13 is a graphic chart showing a map used in the aforesaid routine, for determining a spill control actuator command timing.

If the result of judgment in Step 118 is negative, the routine proceeds to Step 140, where judgment is made as to whether the counted number of the counter i is 1 or not. When the result of judgment is positive, namely, judgment is made that it is immediately after the counted value of the counter is renewed in a sequence of 4 to 1, the routine proceeds to Step 142, where the present time is transferred to a memory $TNE_4$ from a free running timer proceeding at intervals of microseconds for example. Subsequently, the routine proceeds to Step 144, where a spill control actuator command timing $TQ_{fin}'$ of the individual cylinder correction quantity corresponding to the mean engine speed NE is determined by using a map showing the relationship previously stored in the ROM 58D as shown in FIG. 13. Then, the routine proceeds to Step 146, where, as shown in the following formula, the spill control actuator command timing $TQ_{fin}'$ is added to the present time $TNE_4$ and stored in a memory OCR.

$$OCR \leftarrow TNE_4 + TQ_{fin}' \qquad (7)$$

Subsequently, the routine proceeds to Step 148, where the counter p is renewed, thereby completing this interrupt routine ICI.

If the result of judgment in Step 120 is negative and the idling is unstable, the result of judgment in Step 122 is negative and the rotation is unstable due to misfire and the like, and the result of judgment in Step 140 is negative and the counted value of the counter i is judged to be neither 4 nor 1, then the individual cylinder correction quantities $\Delta q$ of every time are not calculated, and the integrated value $\Delta Q_p$ for correction is not changed, thus completing this interrupt routine ICI in this condition.

Figure 14:
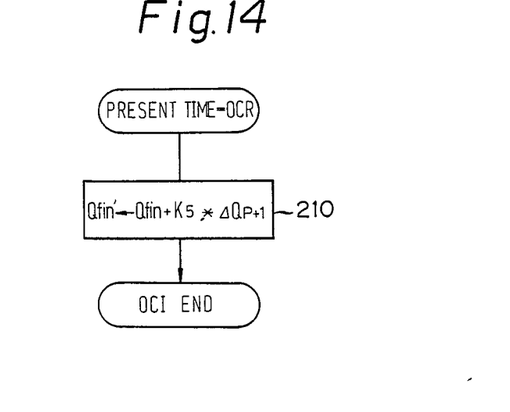
FIG. 14 is a flow chart showing a time coincidence interrupt routine used in the first embodiment, for performing the fuel injection.

Finally, when the time of the free running timer coincides with the spill control actuator command timing determined and stored in the memory OCR in Step 146 of the ICI routine, the CPU proceeds to Step 210 of a time coincidence interrupt routine OCI as shown in FIG. 14, and the correction value $\Delta Q_{p+1}$ multiplied by the correction coefficient $K_5$ is added to the injection quantity $Q_{fin}$ determined from the mean engine speed NE and the accelerator opening Accp by a well known final injection quantity calculating routine as shown in the following formula so as to determine a final injection quantity $Q_{fin}'$, whereby a command is outputted to the spill control actuator 34, so that the fuel injection by the final injection quantity $Q_{fin}'$ can be performed, thus completing this interrupt routine OCI.

$$Q_{fin}' \eta Q_{fin} + (K_5 \times Q_{p+1}) \qquad (8)$$

Since the coefficient of correction $K_5$ (broken line D) used herein can take a value larger than conventional $K_5$ (solid line C) used in the conventional example as indicated in FIG. 12, the correction can be performed more accurately. This is because engine hunting at speeds of 1000 rpm-1500 rpm is mainly caused by the delay in reach of the spill ring. Therefore, if the delay in reach can be prevented as in this embodiment, then the spread between the upper and lower limits of the individual cylinder correction quantities can be widened accordingly.

Figure 15:
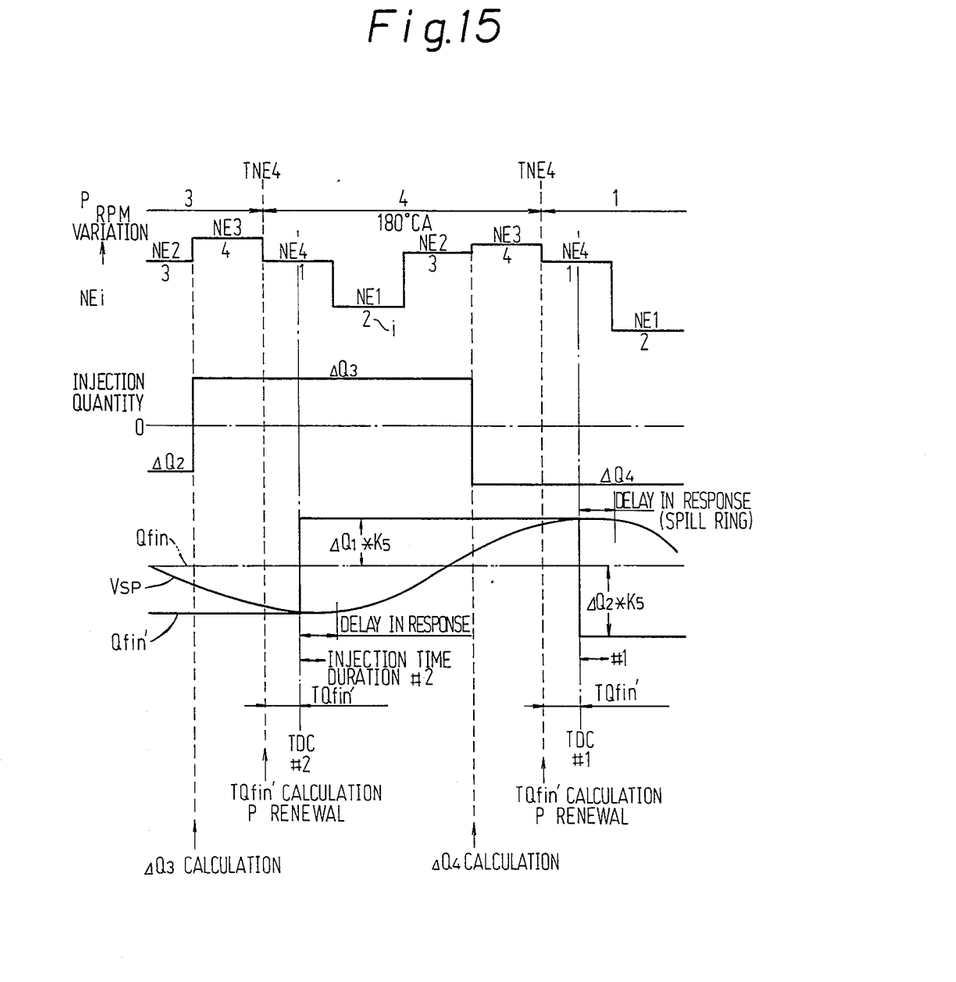
FIG. 15 is a graphic chart showing an example of a signal waveform in the various portions in the first embodiment.

One example of a working waveform in the various portions in the first embodiment is shown in FIG. 15. As apparent from FIG. 15, when the counter i is renewed in a sequence of 3 to 4, namely, immediately after the engine speed $NE_3$ is calculated, the spill control actuator command timing $TQ_{fin}'$ is calculated from the 180° CA mean engine speed NE, and the command timing of the spill control actuator 34 is determined and stored in the memory OCR. It is preferable that this command timing stored in memory OCR normally is calculated from the engine speed NE through 180° CA prior to TDC of the cylinder immediately before the cylinder to be corrected as in this embodiment and is made to coincide substantially with said TDC.

In general, the fuel injection begins substantially at TDC of the cylinder immediately before and ends between ATDC 8° and 10° of the cylinder to be corrected. Since the delay in response of the spill ring is about 33 milliseconds (corresponding to 193° CA-196° CA during idling at about 1000 rpm), if a command value for the succeeding cylinder (e.g., the #1 cylinder) is issued at the TDC of the present cylinder, as in this embodiment, then there is no interference with the injection of the present cylinder (e.g., the #2 cylinder). Thus, a command for the succeeding cylinder (the #1 cylinder) can be performed in the earlier stage as shown in FIG. 5, whereby the spill ring reaches a target quantity before the completion of the injection of the succeeding cylinder (the #1 cylinder), so that a possibility of a delay in reach can be eliminated.

Since the spill control actuator command timing $TQ_{fin}'$ is calculated by using the mean engine speed NE through 180° CA immediately before the command is issued, even when changes in the engine speed are rapid such as during transition time, the optimal command timing can be obtained, so that the delay in reach of the spill ring due to the changes in the engine speed can be avoided.

The second embodiment of the present invention will now be described.

Figure 16:
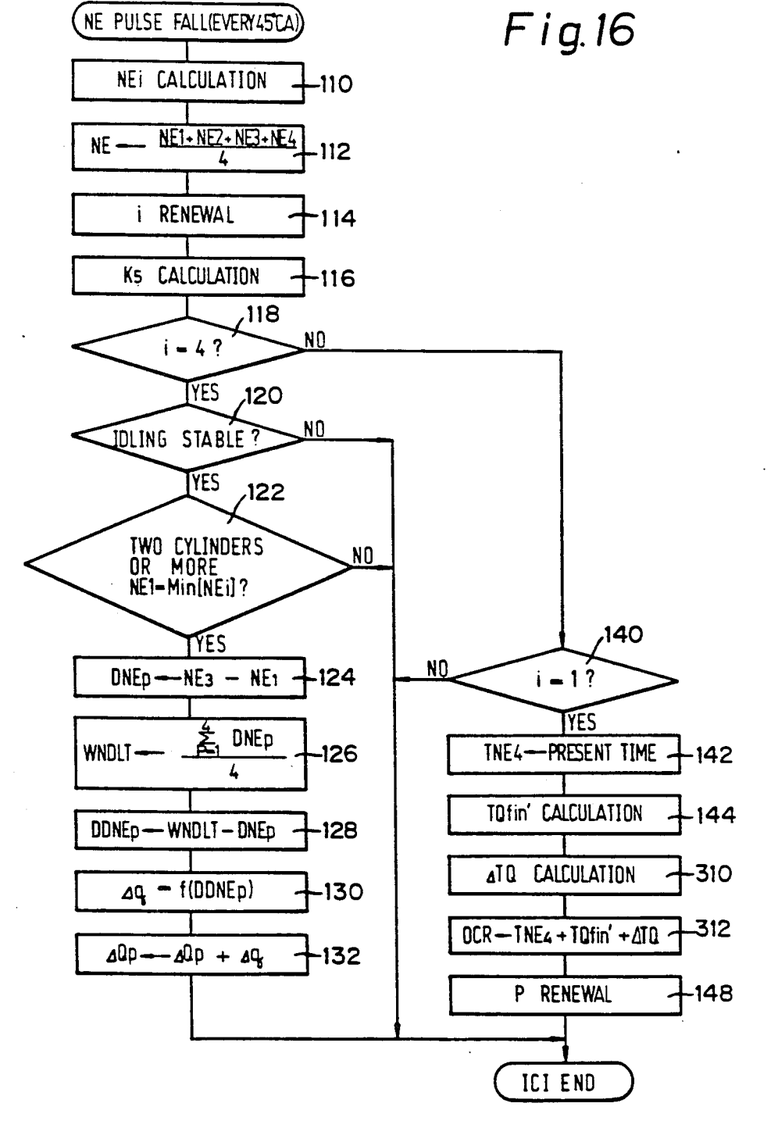
FIG. 16 is a flow chart showing the interrupt routine used in a second embodiment of the electronically controlled engine in a motor vehicle, to which the present invention is applied, for determining individual cylinder injection quantities.

According to this second embodiment, in an electronically controlled diesel engine in a motor vehicle similar to the one in the first embodiment, calculation of the individual cylinder correction quantities of the fuel injection quantities in the ECU 58 thereof is performed in accordance with a flow chart as shown in FIG. 16.

Figure 17:
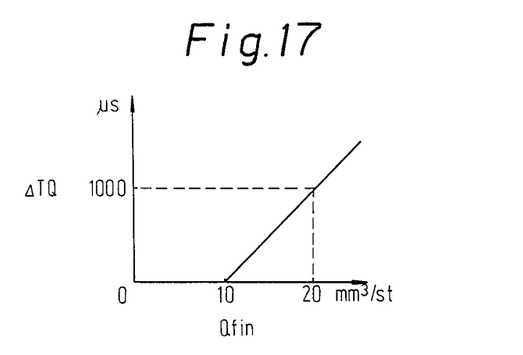
FIG. 17 is a graphic chart showing an example of a map used in the aforesaid routine, for determining a correction command timing.

More specifically, in this second embodiment, an interrupt routine ICI is identical to the one in the first embodiment as shown in FIG. 11 through calculation of the spill control actuator command timing $TQ_{fin}'$ in Step 144. Thereafter, the routine proceeds to step 310, where a command timing correction $\Delta TQ$ corresponding to the injection quantity $Q_{fin}$ is calculated by using a map of the relationship shown in FIG. 17, which is previously stored in the ROM 58D. Subsequently, the routine proceeds to Step 312, where the timing for the control command is calculated through the following formula and stored in the memory OCR.

$$OCR \leftarrow TNE_4 + TQ_{fin}' + \Delta TQ \quad (9)$$

Other aspects are similar to those of the first embodiment, so that detailed description will not be repeated.

Figure 18:
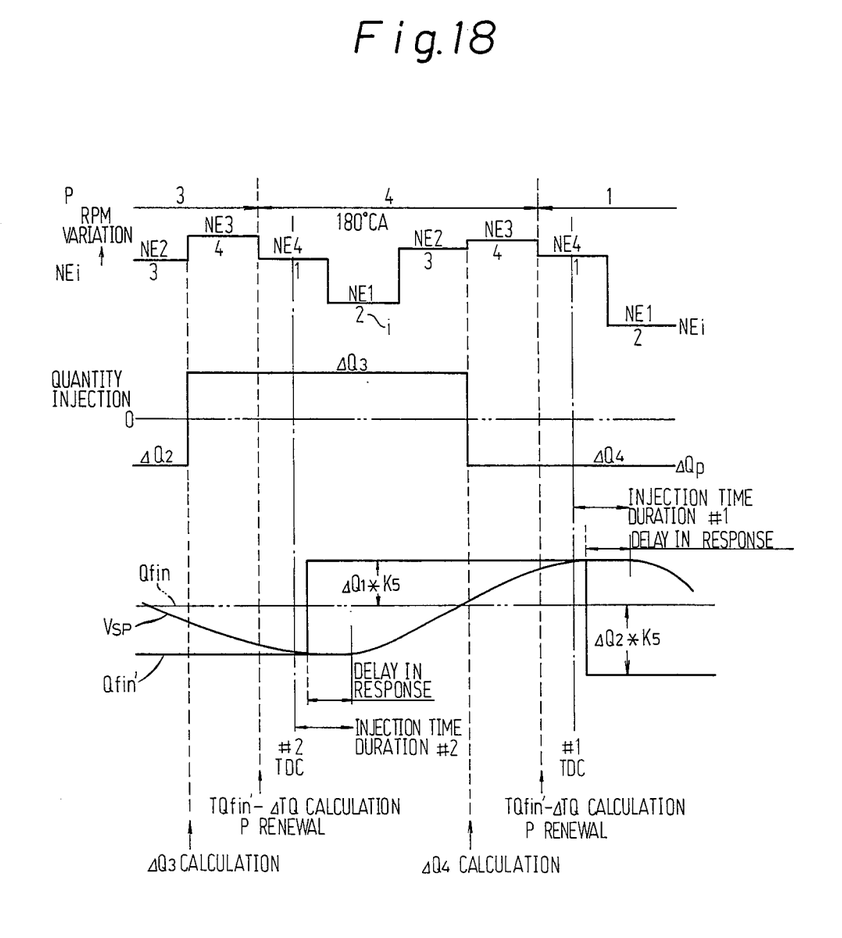
FIG. 18 is a graphic chart showing an example of a signal waveform in the various portions in the second embodiment.

An example of the relationship of a waveform in the various portions in this second embodiment is shown in FIG. 18. As apparent from the drawing, when the injection quantity $Q_{fin}$ is large, the injection time duration becomes long. Hence, if the actuator command $Q_{fin}'$ to the succeeding cylinder (the #1 cylinder) is delivered too early, there is a possibility of interference with the injection quantity of the present cylinder (the #2 cylinder). In this embodiment, the correction command timing $\Delta TQ$ is determined in accordance with the injection quantity $Q_{fin}$, and the command is delayed by a corresponding minimum amount, so that the command to the spill control actuator can be reached before completion of the injection of the #1 cylinder, yet with no interference with the fuel injection quantity to the #2 cylinder.

In both the above embodiments, the present invention has been applied to an electronically controlled diesel engine having a spill ring as the fuel injection quantity control actuator; however, it is apparent that the scope of the present invention need not necessarily be limited to this, and the present invention is applicable to a diesel engine for general use provided with a fuel injection quantity control actuator of any other type.

What is claimed is:

1. A method of adjusting individual fuel injection quantities to successive explosion cylinders in an electronically controlled diesel engine, the method including determining rpm variations for each successive explosion cylinder, calculating a control command for controlling a position of a spill control actuator for each explosion cylinder to adjust the termination of each fuel injection amount so as to eliminate a dispersion in rpm variations between the explosion cylinders, and issuing said control command to the spill control actuator prior to the termination of fuel injection to the corresponding explosion cylinder, wherein the improvement comprises:

providing a signal corresponding to engine speed;
providing a signal corresponding to engine load;
adjusting a timing relative to a fixed crank angle for issuing the control command for each successive explosion cylinder to the spill control actuator, as a function of said engine speed and load signals so as to advance said timing with increasing engine speed and to retard said timing with increasing engine load, said timing being early enough so that the spill control actuator will be able to reach the commanded position before the proper time for termination of the injected fuel amount to said explosion cylinder but not so early as to start movement of the spill control actuator away from a commanded position for the immediately preceding explosion cylinder before completion of fuel injection to said previous explosion cylinder and issuing a control command to the spill control actuator for each successive explosion cylinder at the adjusted timing for said cylinder.

2. A method according to claim 1 wherein the step of providing a signal corresponding to engine speed comprises providing a signal corresponding to a mean engine speed determined through 180 degrees of crank rotation just prior to a top dead center position of an explosion cylinder immediately preceding the cylinder to be corrected.

3. A method according to claim 1 wherein the timing for issuing said control command substantially coincides with reaching the top dead center position in the explosion cylinder immediately preceding the cylinder to be corrected.

4. A method according to claim 1 wherein the step of providing a signal corresponding to engine load comprises providing a signal as a function of fuel injection quantity.

5. A device for controlling individual cylinder fuel injection quantities in an electronically controlled diesel engine, the device comprising a fuel injection pump having a spill ring positionable for terminating a fuel injection from the pump and a spill control actuator coupled to the spill ring for positioning the spill ring in response to a control command signal;
injection nozzles for delivering fuel injection amounts from the fuel injection pump into corresponding combustion chambers;
means for sensing a position of an accelerator control;
means for sensing engine rotation and for determining engine speed;
means for sensing engine load; and
a control unit for determining a target injection quantity for each combustion chamber as a function of sensed accelerator control position and engine speed and for issuing a control command to the spill control actuator to position the spill ring so as to terminate fuel injection upon delivery of a corresponding target injection quantity, wherein the improvement comprises:
said control unit being further arranged for adjusting a timing relative to a fixed crank angle for issuing each control command to the spill control actuator in response to said sensed engine speed and engine load so as to advance said timing with increasing engine speed and to retard said timing with increasing engine load, said timing being early enough so that the spill control actuator will be able to reach the commanded position before the proper time for termination of the injected fuel amount to a corresponding combustion chamber, but not so early as to start movement of the spill ring away from a commanded position for an immediately preceding injection before delivery of the target injection quantity for said preceding injection.

* * * * *